United States Patent [19]

Evans

[11] 4,286,916

[45] Sep. 1, 1981

[54] POWER OPERATED MECHANISMS FOR ACTUATING SWINGING ARMS

[76] Inventor: Gerald P. Evans, Dunderhole Farm, Bishopswood, Ross-on-Wye, Herefordshire, England

[21] Appl. No.: 58,200

[22] Filed: Jul. 17, 1979

[51] Int. Cl.³ .............................. B60P 1/00; B65F 1/00
[52] U.S. Cl. ..................................... 414/546; 414/526
[58] Field of Search ............... 414/546, 547, 526, 487, 414/696, 722, 694, 685

[56] References Cited

U.S. PATENT DOCUMENTS

| 1,915,757 | 6/1933 | Pierce | 414/526 |
|---|---|---|---|
| 2,883,076 | 4/1959 | Palmer | 414/526 |
| 3,113,685 | 12/1963 | Miller | 414/546 |
| 3,184,082 | 5/1965 | Hall | 414/546 |
| 3,325,118 | 6/1967 | Hall | 414/546 X |
| 3,844,433 | 10/1974 | Laajala | 414/526 X |
| 3,902,612 | 9/1975 | Hall | 414/546 X |

*Primary Examiner*—Robert B. Reeves
*Assistant Examiner*—L. E. Williams
*Attorney, Agent, or Firm*—Young & Thompson

[57] ABSTRACT

A power operated mechanism for moving a pair of swinging arms 16 carrying a bucket 19 at their ends includes a pair of double-acting rams 22 each having a piston rod 24 pivotally connected to the cross piece 26 of a T-link 27 which is in turn pivotally connected to a point on the swinging arm 16 displaced from its main pivot 17. The mechanism is carried on a chassis which also carries a slurry tank 11 into which the contents of the bucket 19 are tipped; the slurry tank includes an internal auger 60 which delivers slurry to the rear of the tank where it is pumped up a vertical discharge pipe 51 and then discharged in a downward direction.

12 Claims, 5 Drawing Figures

POWER OPERATED MECHANISMS FOR ACTUATING SWINGING ARMS

This invention is concerned with a load carrying apparatus including a swinging arm and is particularly though not exclusively applicable to apparatus in which the swinging arm is attached to a tanker, trailer, tractor, or other vehicle.

In many instances it is required to move a swinging arm through an arc exceeding 90° and sometimes approaching or exceeding 180°. If the arm carries a heavy load or meets heavy resistance it is difficult to arrange an adequate actuating force from a linear motor such as a hydraulic ram. Particular difficulties are experienced in agricultrual vehicles where it is undesirable to have the actuating mechanism positioned low down on the vehicle.

Accordingly it is an object of the invention to provide an improved load carrying apparatus having means for actuating a swinging arm which will overcome some of the existing problems and disadvantages.

The invention consists in load carrying apparatus including a swinging arm having a container or other load carrying device at its outer end and including power operated mechanism for causing pivotal movements of the swinging arm, the mechanism comprising a reciprocating fluid-actuated ram having one element connected to an anchorage and the other element connected via a pivotal linkage to a point on the swinging arm displaced from its main pivot, and including means for guiding a part of the pivotal linkage to move in a path which avoids intersection with or movement approaching the main swinging arm pivot.

Conveniently the guide means comprises a pivoted control arm with its pivot point located near but displaced from the pivot axis of the main swinging arm. In a particular preferred construction the control arm has a pivot displaced towards the hydraulic ram in relation to the pivot of the main arm, and the effective length of the control arm is greater than the effective distance between the pivot of the main arm and the point on the arm to which the linkage is connected.

The invention also consists in load carrying apparatus including a swinging arm having a container or other load carrying device at its outer end and including power operated mechanism for swinging the arm through an arc greater than 90°, comprising a four-bar mechanism whose links are, in increasing length order, a frame, a first lever, a coupler, and a second lever, the first lever being extended to form the arm, and a reciprocating fluid-actuated ram coupled between the second lever and an extension of the frame outside the linkage.

The invention may be performed in various ways and one specific embodiment will now be described, by way of example, with reference to the accompanying drawings, in which.

Figure 1:
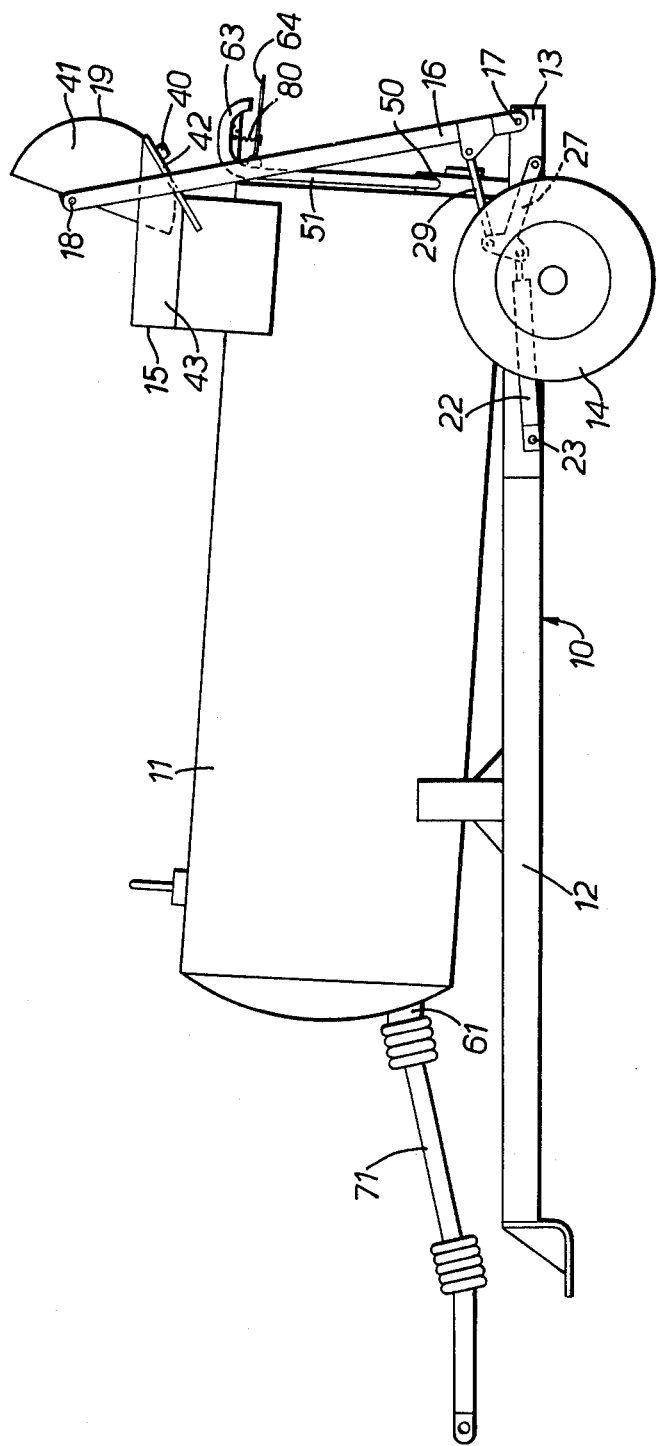
FIG. 1 is a side elevation of a slurry tank vehicle trailer.

In this example the trailer comprises a chassis 10 supporting a long cylindrical tank 11 intended to hold liquid manure or slurry. The chassis consists of a main central spine 12 with a rear sub-frame 13 on which the two ground wheels 14 are mounted. The tank 11 has an inlet opening in the form of a hopper 15 at its rear end and a discharge device which includes a centrifugal pump 50 connected to a discharge pipe 51. A pair of swinging loader arms 16 are pivotally mounted on the rear of the chassis on a hinge axis 17, the two arms being pivotally connected at their free ends 18 to a swinging scoop or bucket 19. The bucket 19 has a square section metal bar 40 secured to it by, for example, welding, and the ends of the bar project laterally from the flat end walls 41 of the bucket 19. The projecting ends of the bar strike the inclined edges 42 of the side walls 43 of the hopper 15 when the arms reach the raised position shown in FIG. 1, and this causes the bucket 19 to pivot about the ends 18 and discharge its contents into the tank. The front of the bucket can, if desired, be tapered somewhat so as to help prevent slurry spilling over the sides of the hopper.

Figure 2:
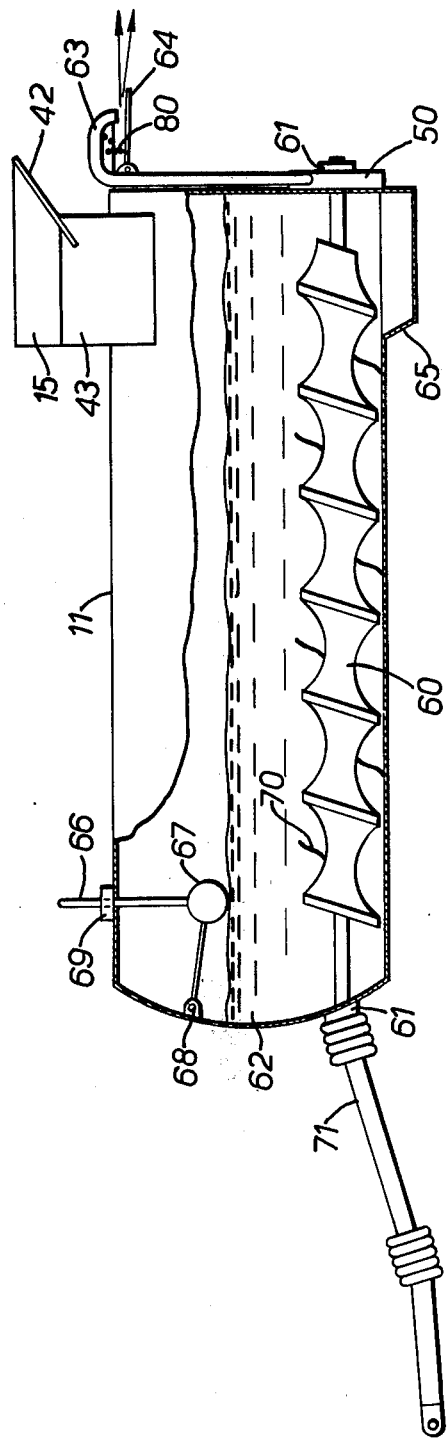
FIG. 2 is a part vertical section through the slurry tank of FIG. 1.
Figure 3:
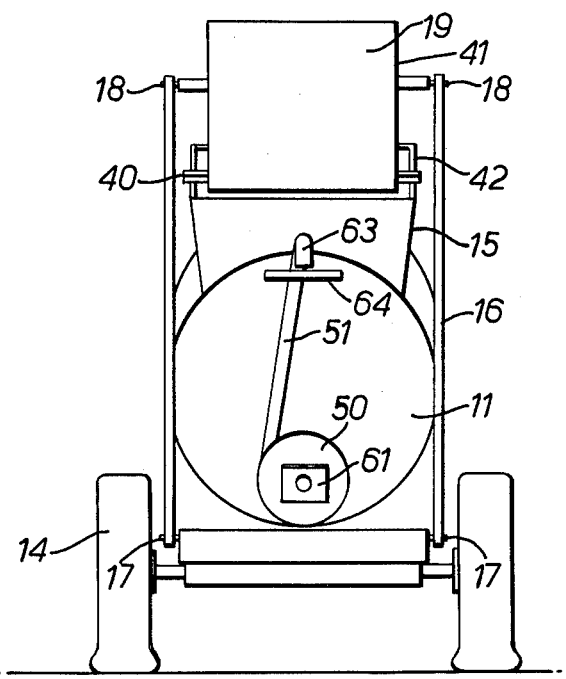
FIG. 3 is a rear view of the trailer.
Figure 4:
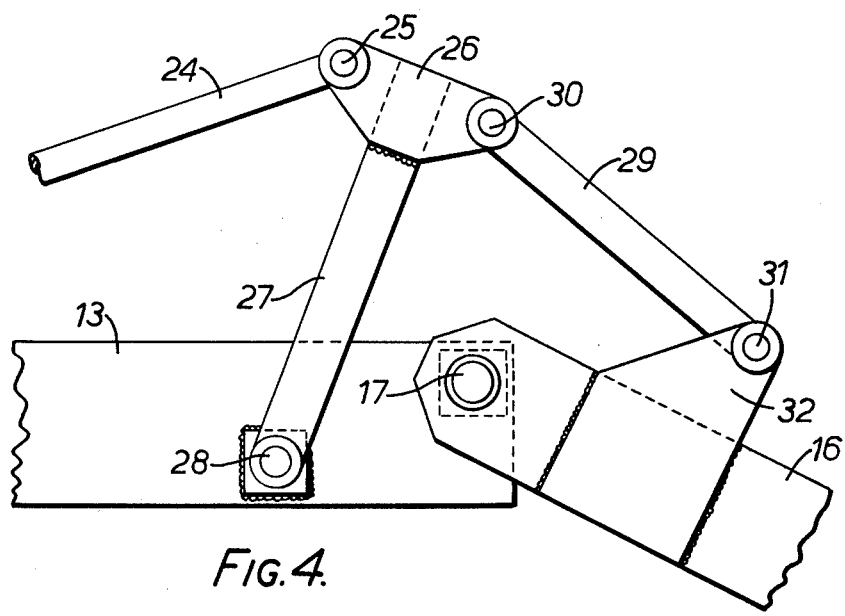
FIG. 4 is a somewhat diagrammatic side elevation on an enlarged scale illustrating the control mechanism and linkage with the arms in a lowered position.

Referring to FIG. 2, the tank 11 contains an auger 60 which is mounted in sealed auger bearings 61 at each end of the tank. The auger may carry flails 70 to help break up the slurry to ease its flow. The auger is driven by a double articulated PTO drive shaft 71 at the front of the tank. This form of drive helps to reduce problems when the tractor or other vehicle pulling the tank makes a sharp turn. Slurry 62 which has been tipped into the tank is conveyed by the auger 60 to the rear of the tank, where it is pumped by the centrifugal pump 50 up the discharge pipe 51, and leaves the pipe at the open end of the inverted U-portion 63, this open end being positioned above the level of the slurry 62 in the tank.

The pressure of slurry in the pipe 51 will cause a spring-loaded flap valve 64 to open so that the slurry can be sprayed in a downward direction. The slurry is also deflected by the flap valve 64 so as to give a wide area of cover, as indicated by the arrows. The tension of the spring 80 which connects the valve 64 to the portion 63 may be adjusted in order to control the application rate of the slurry. Additional control is provided by adjusting the position of the spring 80, or by varying the tractor speed and PTO speed. It has been found that by spraying the slurry downwards and from a level above that of the slurry in the tank, there is less risk of spreading disease and infection to livestock than if the slurry were to be sprayed up into the air. Any large stones in the slurry fall into a stone trap 65 at the rear end of the tank 11 and do not foul the pump 50. The stone trap 65 can be emptied at periodic intervals.

The level of the slurry in the tank can be determined by means of a rod 66 attached to a ball float 67 which is pivotally mounted on the tank at 68. The rod 66 projects through an air vent 69 at the front of the tank and is readily visible from the cab of the tractor or other vehicle which tows the tank. The rod 66 can be graduated to give a direct reading in, for example, liters of the amount of slurry in the tank.

In an alternative embodiment of the invention (not illustrated), the tank is completely open at the top and is mounted in bearings on a support frame so as to be rotatable about a horizontal, longitudinal axis. The extent of rotation of the tank can be adjusted as required in order to discharge the tank contents at any desired rate while the tank is being pulled by a tractor. A spreading rotor inside the tank helps to discharge the contents, and the rotor may be fitted with flails for more efficient spreading.

The mechanism for actuating the loader arms 16 comprises a pair of double-acting hydraulic rams 22, one on each side of the chassis, pivotally mounted at their forward ends 23 to an anchorage on the chassis and having a rearwardly directed piston rod 24. This is pivotally connected at 25 to the cross piece 26 of a T-link 27 which is pivotally mounted on the chassis at its lower end 28 to act as a guide for guiding a further connecting link 29 to move in a path remote from the loader arm pivot. The further connecting link 29 is pivotally attached at 30 to the other end of the cross arm and this link 29 is further connected at a hinge pin 31 to a bracket 32 secured to the upper side of each loader arm 16.

In this particular example the length of the T-link 27 is fifteen inches, the length of the link 29 is thirteen inches, the distance 17–31 is eleven inches and the distance between the hinge pivots 28 and 17 is approximately eight inches, the pivot 28 being approximately three inches lower than the pivot 17.

Figure 5:
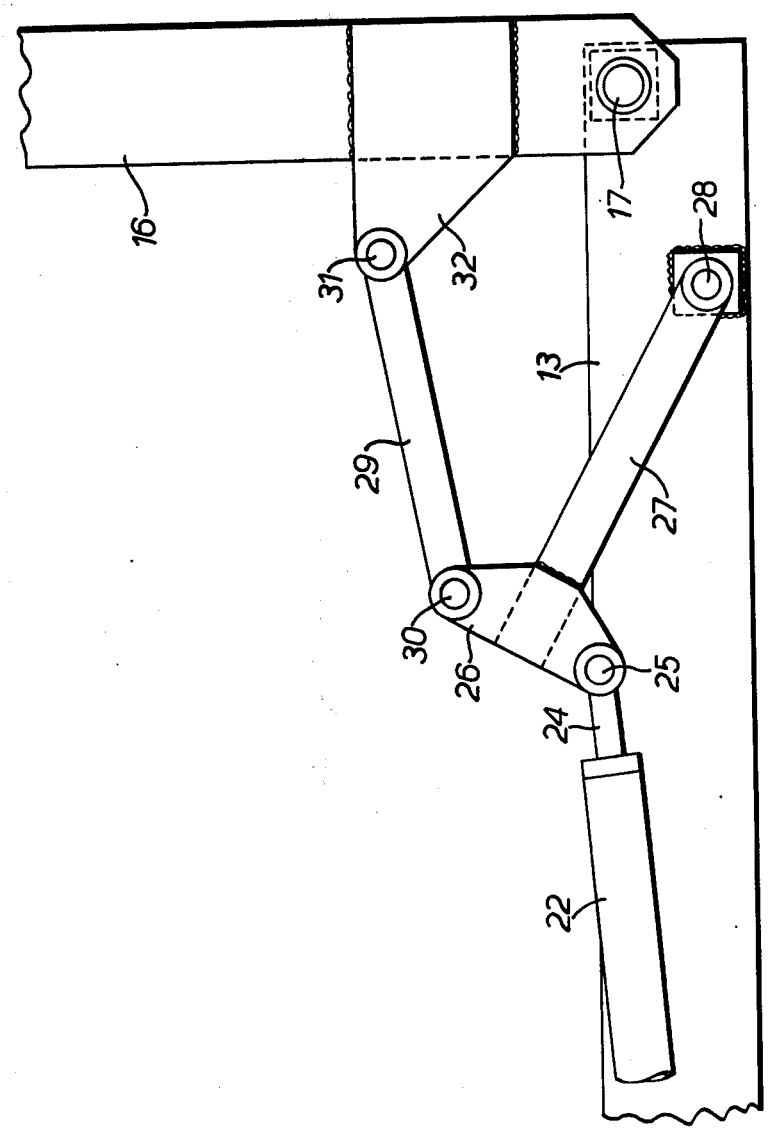
FIG. 5 is a similar view illustrating the mechanism with the arms raised.

With this geometry the hydraulic rams 22 can raise and lower the swinging load arms from the depressed position of FIG. 5 to the fully raised position of FIG. 6, which is through an arc of approximately 180°. Even further movement in excess of 180° is possible. Moreover it will be seen that the mechanism provides a substantial force on the loader arms in the initial stages of the lifting movement particularly when the arms are horizontal and therefore the resistance is greatest.

Instead of the swinging control arms 27 other guides may be provided to control the linkage particularly the path of the hinge connection 30. However in agricultural equipment a linkage guide is preferred since it is less likely to be affected by dirt. The two hinge points 25 and 30 may be combined and some benefit will be obtained even if the arm 27 is of the same length as the distance 17–31 though the full possible benefit will be missed.

Instead of arranging the rams to pull the arms up on their retraction strokes, the mechanism can be reversed so that they raise the arms as they extend. But this is not preferred, as the rams and the linkage would have to be mounted lower down on the vehicle and the piston rods would mostly be left exposed.

Each linkage is, in effect, a four bar mechanism whose links are, in increasing length order, a frame (sub-frame 13) a first lever (arm 16), a coupler (link 29) and a second lever (T-link 27), the first lever being extended to form the complete arm 16. The associated ram is coupled between the second lever and an extension of the frame outside the linkage.

The linkage system and the rams are preferably covered by guards for safety and also to keep out dirt.

I claim:

1. Apparatus for spreading slurry or liquid manure comprising:
   a chassis having wheels that extend below the chassis;
   a tank for the slurry or manure defining an upwardly facing slurry or manure input and having means for discharging the slurry or manure;
   means for mounting the tank on the chassis; and
   means for loading the slurry or manure from a sunken pool into the tank, the loading means comprising a main swinging arm having a pivot at one end and a bucket at its outer end, and a power operated mechanism for causing pivotal movements of said swinging arm, the mechanism comprising a reciprocating fluid-actuated ram having one element connected to an anchorage, a pivotal linkage connecting the other element of the ram to a point on the swinging arm displaced from said pivot, and means for guiding a part of said pivot linkage to move in a path remote from the main swinging arm, the arrangement being such that the mechanism can move the swinging arm from a first position in which the outer end of the swinging arm is below the lowermost point of the wheels and a second position in which the bucket discharges its contents into the tank through the input.

2. Apparatus according to claim 1, in which said guide means comprises a pivoted control arm with its pivot point located near but displaced from the pivot axis of said main swinging arm.

3. Apparatus according to claim 2, in which the pivot of said control arm is displaced towards the fluid-actuated ram in relation to the pivot of the main arm.

4. Apparatus according to claim 2, in which the effective length of said control arm is greater than the effective distance between the pivot of the main arm and the point on the arm to which the said pivotal linkage is connected.

5. Apparatus according to claim 1, in which said mechanism comprises a four-bar linkage whose links are, in increasing length order, a frame, a first lever, a coupler, and a second lever, the first lever being extended to form said main swinging arm, and in which said ram is coupled between the second lever and an extension of said frame outside the linkage.

6. Apparatus according to claim 1, in which the power-operated mechanism is capable of swinging said arm through an arc of at least about 180°.

7. Apparatus according to claim 1, wherein the discharge means discharge the slurry or manure downwardly from a point above the level of the slurry or manure in the tank.

8. Apparatus according to claim 7, further comprising an auger for conveying slurry or manure to the rear of the tank for discharge.

9. Apparatus according to claim 1, further comprising means to tip the bucket automatically when the swinging arm moves to the discharge position.

10. Apparatus as claimed in claim 1, wherein the reciprocating fluid-actuated ram is mounted on the chassis below the level of the tank.

11. Apparatus as claimed in claim 10, wherein the reciprocating fluid actuated ram is disposed between the chassis and a wheel.

12. Apparatus for spreading slurry or liquid manure comprising:
    a wheeled chassis;
    a tank for the slurry or manure defining an upwardly facing slurry or manure input;
    a slurry or manure discharge mechanism comprising an auger for feeding the slurry or manure to the rear of the tank, a discharge pipe for discharging the slurry or manure from a point above the level of slurry or manure in the tank and a pump for pumping the slurry or manure through the discharge pipe; and means for loading the slurry or manure from a sunken pool into the tank comprising a swinging arm having a pivot at one end and a bucket at its other end, a power operated mechanism for causing pivotal movements of the swinging arm between a first position in which the outer end of the swinging arm is below the lowermost point of the wheels and a second position in which the bucket is positioned adjacent the input and means for tipping the bucket to discharge its contents through the input.

* * * * *